(12) United States Patent
Irish et al.

(10) Patent No.: US 7,382,777 B2
(45) Date of Patent: Jun. 3, 2008

(54) METHOD FOR IMPLEMENTING ACTIONS BASED ON PACKET CLASSIFICATION AND LOOKUP RESULTS

(75) Inventors: John David Irish, Rochester, MN (US); Ibrahim Abdel-Rahman Ouda, Rochester, MN (US); James A. Steenburgh, Rochester, MN (US); Jason Andrew Thompson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1081 days.

(21) Appl. No.: 10/463,288

(22) Filed: Jun. 17, 2003

(65) Prior Publication Data

US 2004/0258067 A1    Dec. 23, 2004

(51) Int. Cl.
*H04L 12/56* (2006.01)
*G06F 12/00* (2006.01)
*G06F 15/173* (2006.01)

(52) U.S. Cl. .............. 370/392; 370/395.32; 370/401; 709/240; 711/216; 711/221

(58) Field of Classification Search ............... 370/229, 370/230, 351, 389, 392, 395.21, 400, 410, 370/411, 412, 428, 395.32, 401; 709/223, 709/224, 230, 234, 238, 239, 240; 711/216, 711/221
See application file for complete search history.

(56) References Cited

U.S. PATENT DOCUMENTS

| 6,598,034 | B1* | 7/2003 | Kloth | 706/47 |
| 6,600,744 | B1* | 7/2003 | Carr et al. | 370/392 |
| 7,054,315 | B2* | 5/2006 | Liao | 370/392 |
| 7,193,997 | B2* | 3/2007 | Van Lunteren et al. | 370/392 |
| 7,227,842 | B1* | 6/2007 | Ji et al. | 370/235 |
| 7,233,597 | B2* | 6/2007 | Kumar et al. | 370/401 |
| 2002/0009076 | A1* | 1/2002 | Engbersen et al. | 370/389 |
| 2003/0217046 | A1* | 11/2003 | Yuan et al. | 707/3 |
| 2004/0022243 | A1* | 2/2004 | Jason | 370/389 |
| 2006/0029104 | A1* | 2/2006 | Jungck | 370/498 |

* cited by examiner

*Primary Examiner*—Alpus H Hsu
(74) *Attorney, Agent, or Firm*—Joan Pennington

(57) ABSTRACT

A method and apparatus are provided for implementing predefined actions based upon packet classification and lookup results in a communications network processor. A plurality of sets of rules is defined. Each rule set includes at least one rule and each rule has a set of masked compares for comparing results of hits and misses of table lookups. Each masked compare set has an associated field for selecting an action. The action defines a set of one or more commands and each command defines a processing operation. One rule set is identified based upon the packet classification result for a received packet. When one of the rules is identified having a match of the masked compares, then the action of associated with the identified rule is selected. Otherwise a default action is provided responsive to no rule of the identified rule set having a match of the masked compares.

6 Claims, 4 Drawing Sheets

RULE SET 300

| | | | | |
|---|---|---|---|---|
| RULE 1 | PRIORITY 1 | MASK | COMPARE VALUE | ACTION |
| RULE 2 | PRIORITY 2 | MASK | COMPARE VALUE | ACTION |
| RULE 3 | PRIORITY 3 | MASK | COMPARE VALUE | ACTION |
| RULE 4 | PRIORITY 4 | MASK | COMPARE VALUE | ACTION |
| | DEFAULT | | | ACTION |

FIG. 3

METHOD FOR IMPLEMENTING ACTIONS BASED ON PACKET CLASSIFICATION AND LOOKUP RESULTS

FIELD OF THE INVENTION

The present invention relates generally to the data processing field, and more particularly, relates to a method and apparatus for implementing predefined actions based upon packet classification and lookup results in a communications network processor.

DESCRIPTION OF THE RELATED ART

Network processing functions of a network processor must be performed at a high rate to avoid causing any bottleneck in the communications network.

Network processing functions, such as the process of Ethernet bridging, routing, and filtering, typically are performed by software running on a general purpose processor, such as a PowerPC processor, or on a special purpose processor, such as an embedded picoprocessor. For example, in the IBM NPe405H, the packet type recognition, table lookups and interpretation of the results are all handled in software running on a PPC405 processor core. Another example is the IBM NP4GS3 where packet type recognition is done by a hard wired logic block, the table lookups are done by a special purpose Tree Search Engine and the results are interpreted by software running on a picoprocessor.

A need exists for an improved mechanism for interpreting the results of packet format recognition and table searches and performing actions based upon those results. It is desirable that such a mechanism is implemented in hardware to minimize software usage and processor overhead.

SUMMARY OF THE INVENTION

A principal object of the present invention is to provide a method and apparatus for implementing predefined actions based upon packet classification and lookup results in a communications network processor. Other important objects of the present invention are to provide such method and apparatus for implementing predefined actions based upon packet classification and lookup results substantially without negative effect and that overcome many of the disadvantages of prior art arrangements.

In brief, a method and apparatus are provided for implementing predefined actions based upon packet classification and lookup results in a communications network processor. A plurality of sets of rules is defined. Each rule set includes at least one rule and each rule has a set of masked compares for comparing results of hits and misses of table lookups. Each masked compare set has an associated field for selecting an action. The action defines a set of one or more commands and each command defines a processing operation. One rule set is identified based upon the packet classification result for a received packet. When one of the rules is identified having a match of the masked compares, then the action of associated with the identified rule is selected.

In accordance with features of the invention, a default action is provided responsive to no rule of the identified rule set having a match of the masked compares. When a plurality of rules of the identified rule set having a match of the masked compares is identified; and then one of the plurality of the rules having a highest priority is identified; and the action of the identified rule having the highest priority is selected.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 is a block diagram illustrating a rule set in accordance with the preferred embodiment.

DETAILED DESCRIPTION OF THE PREFERRED EMBODIMENTS

Figure 1:
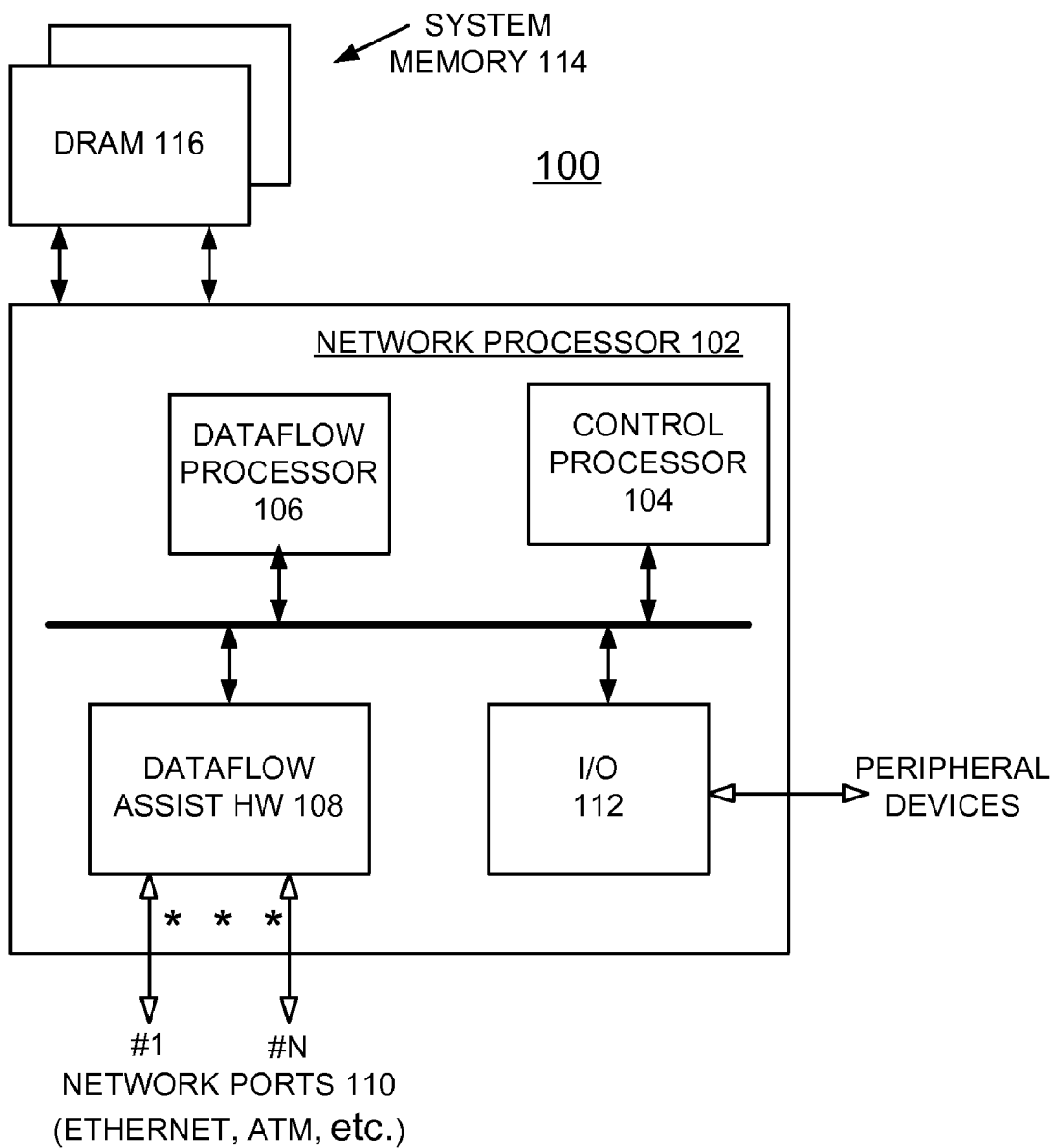
FIG. 1 is a block diagram representation illustrating a network processor system for implementing predefined actions based upon packet classification and lookup results in accordance with the preferred embodiment.

Having reference now to the drawings, in FIG. 1, there is shown a network processor system generally designated by the reference character 100 for carrying out methods for implementing predefined actions based upon packet classification and lookup results of the preferred embodiment. As shown in FIG. 1, network processor system 100 includes a network processor 102. Network processor system 100 includes a control processor 104, and a dataflow processor 106 coupled by a network processor bus to dataflow assist hardware (HW) 108 of the preferred embodiment. The dataflow assist hardware (HW) 108 of the preferred embodiment is coupled to multiple network ports #1-N 110 for communicating using known network protocols, such as, an Asynchronous Transfer Mode (ATM), Ethernet, and the like. Network processor system 100 includes an input/output (I/O) 112 coupled to peripheral devices. Network processor system 100 includes a system memory 114 including a dynamic random access memory (DRAM) 116.

Network processor 102 can be implemented with various standard processors, for example, with one of the PowerPC® line of processors manufactured by International Business Machines Corporation.

Figure 2:
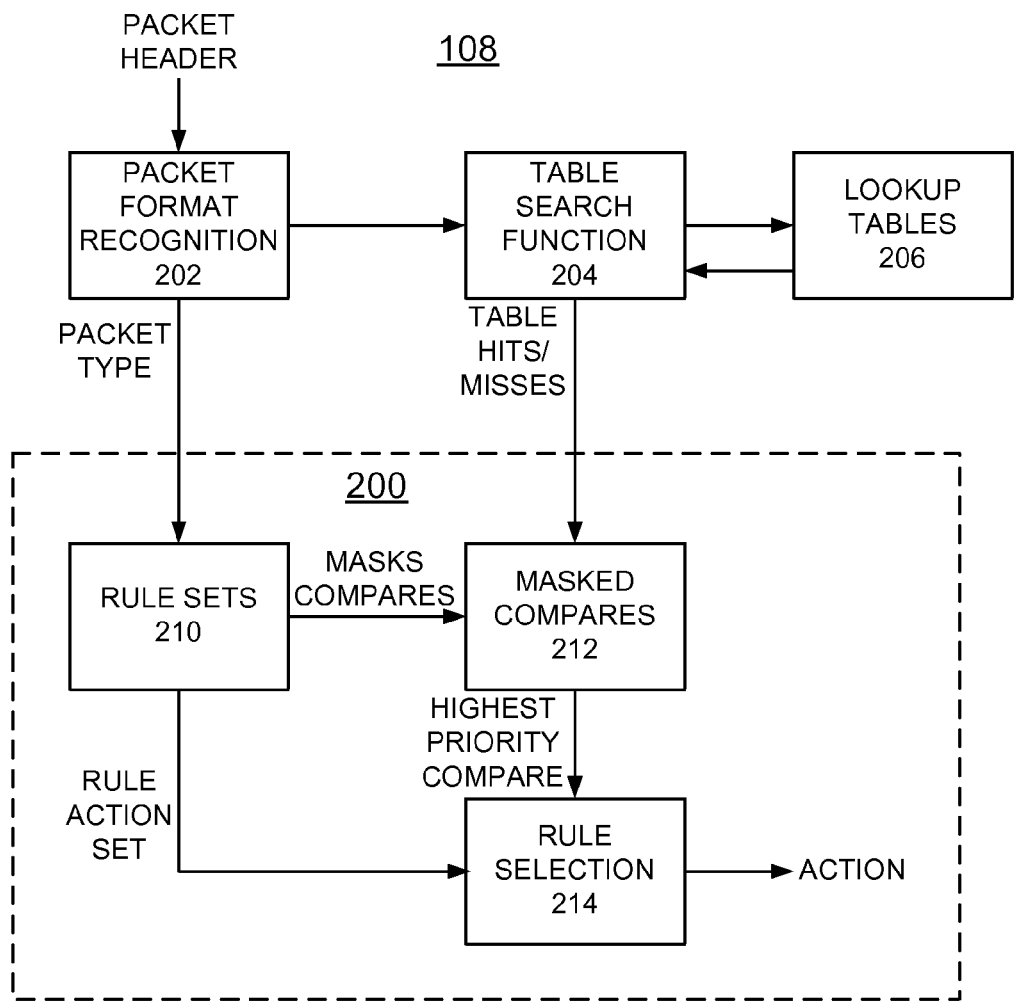
FIG. 2 is a block diagram representation illustrating an exemplary hardware implementation for performing the predefined actions in the network processor system of FIG. 1 in accordance with the preferred embodiment.
Figure 4:
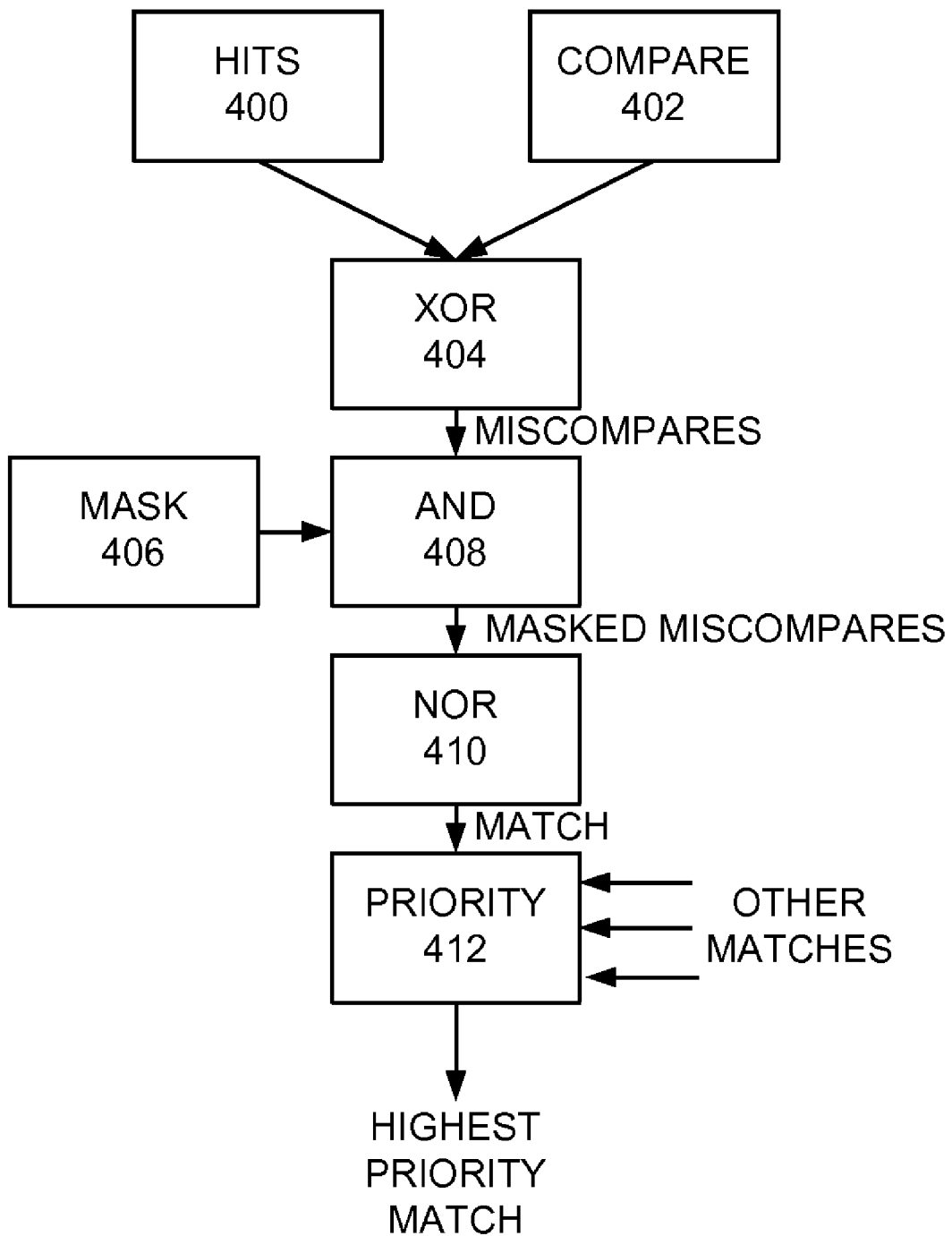
FIG. 4 is a diagram illustrating exemplary logic of the hardware implementation of FIG. 2 for performing the predefined actions in accordance with the preferred embodiment.

In accordance with features of the preferred embodiment, dataflow assist hardware (HW) 108 includes a hardware mechanism 200, as illustrated and described with respect to FIGS. 2, 3 and 4, for implementing predefined actions based upon packet classification and lookup results. The hardware mechanism of the preferred embodiment is used in the process of routing, filtering and/or decoding for protocol termination, packets that arrive on the ports of a processing node in a communications network. The hardware mechanism of the preferred embodiment receives a packet type and table lookup results of a function that recognizes packet formats, builds lookup keys depending on the packet format and then performs a series of table searches. The hardware mechanism of the preferred embodiment interprets the results of the packet format recognition and table searches and performs actions based on those results. The hardware mechanism of the preferred embodiment includes an efficient hardware implementation and flexibility in allowing functions like Ethernet bridging and Internet Protocol (IP) filtering and routing to be performed by the same hardware.

In accordance with features of the preferred embodiment, a plurality of rule sets is provided to determine how to interpret table lookup results and what actions to take based on those results. The rule set that is used is selected based upon the results of the packet format recognition block. For example, an IPV4 packet with no options in the header could use one rule set and an Address Resolution Protocol packet could use another rule set. Each rule has a set of masked compares that look at the combination of hits and misses from the table lookups. Each masked compare has a field associated with it that selects from a set of commands. For example, the commands specified by this invention include:

| | |
|---|---|
| NOOP | Produce default results. |
| Discard | Cause the packet to be discarded. |
| Route Based on Search N | Route the packet based on information pointed to by table lookup number N. |
| IP Route | Route the packet based on information pointed to by the first Direct IP Routing table entry found. |
| Turn the packet over to Software running on a processor of some type. | Force the packet to be handled by software. |

Referring now to FIG. 2, the dataflow assist hardware (HW) 108 is shown with an exemplary hardware implementation of the hardware mechanism 200 for performing the predefined actions in the network processor system 100 in accordance with the preferred embodiment.

As shown in FIG. 2, the dataflow assist hardware (HW) 108 includes a packet format recognition function 202 that recognizes packet formats, and applies a packet type to the hardware mechanism 200. The packet format recognition function 202 builds lookup keys depending on the packet format for a table search function 204 coupled to a series of lookup tables 206. The table search function 204 performs a series of table searches and applies table search results of hits and misses to the hardware mechanism 200.

Hardware mechanism 200 includes a rule sets function 210 defining a plurality of sets of rules. A packet type control is applied to the rule sets function 210 for selecting one rule set based upon this packet classification result for the received packet header.

Referring also to FIG. 3, an exemplary rule set generally designated by the reference character 300 in accordance with the preferred embodiment is shown. As shown in FIG. 3, each rule has a set of masked compares for comparing results of hits and misses of table lookups; and each masked compare has an associated field for selecting an action. The action defines a set of one or more commands with each command defining a processing operation, for example, as listed above.

Hardware mechanism 200 includes a masked compares function 212 receiving the table lookup results of hits and misses for the table search function 204. The masked compares function 212 receives the set of masked compares for each rule of the selected rule set for comparing results of hits and misses of table lookups and the mask compares to identify one rule of the selected rule set having a match of the masked compares and having a highest priority. For each rule of the selected rule set, the set of masked compares includes a bit mask including a number of bits related to the table lookup results. The bit mask includes a pattern of bit values related to the table lookup results. For example, the pattern of bit values includes a 0 value corresponding to each don't care table lookup result and a 1 value corresponding to a selected table lookup result. Then a match of the masked compares and the results of hits and misses of table lookups is identified where a hit results for each selected table lookup result where the mask bit is a 1 value.

Hardware mechanism 200 includes a rule selection function 214 that receives the identified highest priority compare from the masked compares function 212 and selects the action of associated with the masked compare of the identified rule. If none of the provided masked compares match the combination of table lookup hits and misses, a default command as shown in rule set 300 is executed. For example, such as the default command is one of the NOOP, Discard or Turn the packet over to Software commands that is executed when no match is found.

FIG. 4 illustrates exemplary logic for implementing the hardware mechanism 200 for performing the predefined actions in accordance with the preferred embodiment. The illustrated exemplary logic is provided and operated in parallel for each rule of the selected rule set, such as rule set 300. Hits from the results of the table lookups as indicated in a block 400 and the compare table lookup results of hits and misses as indicated in a block 402 are applied to a exclusive OR (XOR) gate 404 that provides at its output miscompares or results that do not match. A bit mask for the rule as indicated in a block 406 and the miscompares are ANDed by an AND gate 408 that provides at its output masked miscompares. The masked miscompares are applied to a NOR gate 410 to provide a match at the output of NOR gate 410, if any. A priority function 412 receives other matches from the hardware logic operating in parallel for other rules of the identified rule set for identifying the highest priority match.

As an example, assume that the processing node is set up to do Ethernet switching as determined by the packet format recognition function 202. The table search logic of table search function 204 is set up to do three table searches of lookup tables 206, for example, as follows:

1. Look up the media access control (MAC) source address (SA) to see if the source of the packet is known.

2. Look up the MAC destination address (DA) to route the packet to its destination.

3. Look up the virtual local area network (VLAN) ID in case a broadcast is needed.

Exemplary masked-compare/command combinations used in accordance with the preferred embodiment for this function is shown in TABLE 1:

TABLE 1

| Hits | Command | Comment |
|---|---|---|
| 0xx | Turn the packet over to Software | Allow MAC SA to be learned by adding it to MAC table |
| 11x | Route Based on Search 2 | Use the information stored in the MAC table to route |
| 101 | Route Based on Search 3 | Use the information store in the VLAN table to broad |
| 100 | Turn the packet over to Software | Allow software to inform the Control Point about an |
| 100 | NOOP | not used |

A second example would be IP routing with Differentiated Services over Ethernet connections. Traditional frame routing capability provided in network processor devices typically utilize a network routing table having entries which provide a single next hop for each table entry. As known in current Internet (network) packet routing protocols there may be implemented Internet Protocol (IP) Differentiated Services (DiffServ) which define a type of packet communication service. The assumed table search logic is set up to do up to four searches:

1. Look up the IP DA to find the Next Hop IP address.

2. If the first lookup returned an indirect address, use the indirect address to look up the true Next Hop IP address (Boundary Gateway Protocol).

3. Look up the Next Hop IP address in the ARP table to find the MAC DA of the next hop.

4. Do a Lookup based on the input Port number, IP, SA, IP, DA, and IP Protocol fields to find the Diffserv Flow ID.

Exemplary masked-compare/command combinations used in accordance with the preferred embodiment for this function is shown in TABLE 2:

TABLE 2

| Hits | Command | Comments |
|---|---|---|
| 111x | IP Route | If the first search returned an indirect address<br>  If Search 4 also got a hit<br>    Route the packet based on the results of Search 2<br>    Provide the results of search 3 as the MAC DA for pkt<br>    Provide the results of search 4 as the Diffserv Flow ID<br>  Else<br>    Perform default command<br>Else<br>  Route the packet based on the results of Search 1<br>  Provide the results of search 2 as the MAC DA for pkt<br>  Provide the results of search 3 as the Diffserv Flow ID |
| Default | Turn the packet over to Software | Software may perform further lookups and/or routing, etc. |

Filtering is done by setting up a search on at least one field and setting the masked-compare/command combination to be a Discard if that search returned a hit.

While the present invention has been described with reference to the details of the embodiments of the invention shown in the drawing, these details are not intended to limit the scope of the invention as claimed in the appended claims.

What is claimed is:

1. A method for implementing predefined actions based upon packet classification and table lookup results in a communications network processor comprising the steps of:
   defining a plurality of sets of rules,
   each said rule having a set of masked compares for comparing results of hits and misses of table lookups;
   each said masked compare having an associated field for selecting an action; said action defining a set of commands; each said command defining a processing operation;
   receiving a packet header and identifying one said rule set based upon the packet classification result;
   identifying one said rule of said identified rule set having a match of said masked compares;
   selecting said action of said identified one said rule;
   identifying a plurality of said rules of said identified rule set having a match of said masked compares; and
   identifying one said rule of said plurality of said rules having a highest priority; and selecting said action of said identified one said rule having said highest priority.

2. A method for implementing predefined actions based upon packet classification and table lookup results in a communications network processor as recited in claim 1 includes the steps of providing a default action responsive to no rule of said identified rule set having a match of said masked compares.

3. A method for implementing predefined actions based upon packet classification and table lookup results in a communications network processor as recited in claim 1 wherein the step of identifying one said rule of said identified rule set having said match of said masked compares includes the steps of providing hardware logic operating in parallel for each said rule of said identified rule set for identifying said match of said masked compares.

4. A method for implementing predefined actions based upon packet classification and table lookup results in a communications network processor as recited in claim 1 wherein each said set of masked compares includes a bit mask including a number of bits related to the table lookup results.

5. A method for implementing predefined actions based upon packet classification and table lookup results in a communications network processor as recited in claim 4 wherein said bit mask includes a pattern of bit values related to the table lookup results.

6. A method for implementing predefined actions based upon packet classification and table lookup results in a communications network processor as recited in claim 5 wherein said pattern of bit values includes a 0 value corresponding to each don't care table lookup result and a 1 value corresponding to a selected table lookup result.

* * * * *